US012780207B2

(12) United States Patent
Chae et al.

(10) Patent No.: US 12,780,207 B2
(45) Date of Patent: Nov. 3, 2026

(54) APPARATUS FOR CONTROLLING BIASED DRIVING OF VEHICLE AND METHOD THEREOF

(71) Applicants: Hyundai Motor Company, Seoul (KR); Kia Corporation, Seoul (KR)

(72) Inventors: Heung Seok Chae, Incheon (KR); Beom Jun Kim, Seoul (KR); Yoo Suk Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 403 days.

(21) Appl. No.: 18/241,053

(22) Filed: Aug. 31, 2023

(65) Prior Publication Data

US 2024/0326817 A1 Oct. 3, 2024

(30) Foreign Application Priority Data

Mar. 30, 2023 (KR) ........................ 10-2023-0042174

(51) Int. Cl.

*B60W 30/18* (2012.01)
*B60W 40/02* (2006.01)
*B60W 60/00* (2020.01)
*G06V 20/58* (2022.01)

(52) U.S. Cl.

CPC .... *B60W 30/18163* (2013.01); *B60W 60/001* (2020.02); *G06V 20/58* (2022.01); *B60W 2554/801* (2020.02)

(58) Field of Classification Search

CPC ......... B60W 30/18163; B60W 60/001; B60W 2554/801; B60W 30/18009; B60W 40/02; B60W 2420/403; B60W 2420/408; B60W 2554/20; B60W 2554/40; B60W 2720/10; G06V 20/58

USPC ........................................................... 701/23

See application file for complete search history.

(56) References Cited

U.S. PATENT DOCUMENTS

| | | | | |
|---|---|---|---|---|
| 10,933,871 | B2 | 3/2021 | Choi | |
| 2019/0263403 | A1 | 8/2019 | Choi | |
| 2019/0389461 | A1* | 12/2019 | Ohmura | B60W 30/146 |
| 2021/0046928 | A1* | 2/2021 | Ohmura | B60W 50/12 |
| 2023/0135893 | A1* | 5/2023 | Fujita | B62D 15/025<br>701/41 |
| 2024/0051525 | A1* | 2/2024 | Kim | B60W 30/0956 |

FOREIGN PATENT DOCUMENTS

| | | |
|---|---|---|
| KR | 10-2037235 B | 10/2019 |

* cited by examiner

*Primary Examiner* — Hossam M Abd El Latif
(74) *Attorney, Agent, or Firm* — MORGAN, LEWIS & BOCKIUS LLP

(57) ABSTRACT

An apparatus for controlling biased driving of a vehicle includes a first sensor which is configured to detect an obstacle on a road, a second sensor that captures a surrounding image of the obstacle, and a controller which is configured for determining an overtaking speed based on at least one of a speed of the obstacle, an lane encroachment amount of the obstacle, or a lateral separation distance from the obstacle, and is configured to control the vehicle to overtake the obstacle at the overtaking speed when the vehicle travels biased in a lane of the road due to the obstacle.

20 Claims, 6 Drawing Sheets

APPARATUS FOR CONTROLLING BIASED DRIVING OF VEHICLE AND METHOD THEREOF

CROSS-REFERENCE TO RELATED APPLICATION

The present application claims priority to Korean Patent Application No. 10-2023-0042174, filed on Mar. 30, 2023, the entire contents of which is incorporated herein for all purposes by this reference.

BACKGROUND OF THE PRESENT DISCLOSURE

Field of the Present Disclosure

The present disclosure relates to a technology for controlling the speed of a vehicle to reduce a sense of discomfort felt for a driver during biased driving in a lane.

Description of Related Art

Vehicle-to-vehicle ad-hoc network (V2V) technology communicates in a pre-allocated frequency band (e.g., 5.9 GHZ) when vehicles are in a communicable area, and utilizes wireless access in vehicular environments (WAVE) technology known as road-only wireless communication among short-range wireless communication technologies based on carrier sense multiple access/collision detection (CSMA/CD).

A V2V system implemented in one vehicle collects state information of the one vehicle, transmits the state information of the one vehicle to another vehicle by use of the above-described wireless communication technology, and receives state information of the other vehicle from the other vehicle. In the instant case, the state information of the other vehicle is used to control the one vehicle. Accordingly, one vehicle may transmit airbag deployment, collision-related events, path history information, and the like to another vehicle, and the other vehicle may perform appropriate control accordingly.

Meanwhile, an autonomous vehicle may recognize road environment by itself, determine a driving situation, and move from a current location to a target location along a planned driving route. Such an autonomous vehicle may include autonomous emergency braking (AEB), a forward collision warning (FCW) system, adaptive cruise control (ACC), a lane departure warning system (LDWS), a lane keeping assist system (LKAS), blind spot detection (BSD), rear-end collision warning (RCW) system, a smart parking assist system (SPAS), a highway driving assist system (HDAS), and the like.

An autonomous vehicle operates in a biased-driving mode in a lane when an obstacle (e.g., a stationary obstacle or a moving obstacle) is located in the driving lane, an obstacle approaches in the driving lane, or an obstacle enters the driving lane. In the instant case, the biased-driving mode means that the vehicle travels on one side of the driving lane rather than the center of the driving lane.

In a process of overtaking the obstacle during biased driving in a lane, the optimum speed cannot be determined, and thus the user's sense of discomfort cannot be reduced. Therefore, there is urgently required a solution.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus for controlling biased driving of a vehicle and method configured for reducing a user's sense of discomfort during biased driving in a lane by determining an overtaking speed based on one of a speed of an obstacle, a lane encroachment amount of the obstacle, and a lateral separation distance from the obstacle and controlling the vehicle to overtake the obstacle at the overtaking speed in an overtaking section including a start point and an end point of overtaking for the obstacle when the vehicle travels biased in the lane due to the obstacle.

Another aspect of the present disclosure provides an apparatus for controlling biased driving of a vehicle and method configured for reducing a user's sense of discomfort during biased driving in a lane by determining an overtaking speed based on a speed of an obstacle and a lane encroachment amount of the obstacle and controlling the vehicle to overtake the obstacle at the overtaking speed in an overtaking section including a start point and an end point of overtaking for the obstacle when the vehicle travels biased in the lane due to the obstacle.

Yet another aspect of the present disclosure provides an apparatus for controlling biased driving of a vehicle and method configured for reducing a user's sense of discomfort during biased driving in a lane by determining an overtaking speed based on a speed of an obstacle and a lateral separation distance from the obstacle and controlling the vehicle to overtake the obstacle at the overtaking speed in an overtaking section including a start point and an end point of overtaking for the obstacle when the vehicle travels biased in the lane due to the obstacle.

The technical problems to be solved by the present disclosure are not limited to the aforementioned problems, and any other technical problems not mentioned herein will be clearly understood from the following description by those skilled in the art to which the present disclosure pertains. Also, it may be easily understood that the objects and advantages of the present disclosure may be realized by the units and combinations thereof recited in the claims.

According to an aspect of the present disclosure, an apparatus for controlling biased driving of a vehicle includes a first sensor which is configured to detect an obstacle on a road, a second sensor that captures a surrounding image of the obstacle, and a controller which is configured for determining an overtaking speed based on at least one of a speed of the obstacle, an lane encroachment amount of the obstacle, or a lateral separation distance from the obstacle, and is configured to control the vehicle to overtake the obstacle at the overtaking speed when the vehicle travels biased in a lane of the road due to the obstacle.

In an exemplary embodiment of the present disclosure, the controller may be configured to determine the overtaking speed applied in an overtaking section including a start point and an end point of overtaking for the obstacle.

In an exemplary embodiment of the present disclosure, the controller may be configured to determine the overtaking speed based on the speed of the obstacle and the lane encroachment amount of the obstacle.

In an exemplary embodiment of the present disclosure, the controller may be configured to determine a safe speed based on a current speed of the vehicle and the speed of the obstacle, determine a weight corresponding to the lane encroachment amount of the obstacle, and determine the overtaking speed by applying the weight to the safe speed and a preset maximum speed of the vehicle.

In an exemplary embodiment of the present disclosure, the controller may be configured to determine a first speed as the safe speed when the current speed of the vehicle does not exceed the first speed obtained by adding a first reference speed to the speed of the obstacle.

In an exemplary embodiment of the present disclosure, the controller may be configured to determine a second speed as the safe speed when the current speed of the vehicle exceeds the second speed obtained by adding a second reference speed to the speed of the obstacle.

In an exemplary embodiment of the present disclosure, the controller may be configured to determine the current speed of the vehicle as the safe speed when the current speed of the vehicle is greater than the first speed and less than or equal to the second speed.

In an exemplary embodiment of the present disclosure, the controller may be configured to determine the overtaking speed based on the speed of the obstacle and the lateral separation distance from the obstacle.

In an exemplary embodiment of the present disclosure, the controller may be configured to determine a safe speed based on a current speed of the vehicle and the speed of the obstacle, determine a weight corresponding to the lateral separation distance from the obstacle, and determine the overtaking speed by applying the weight to the safe speed and a preset maximum speed of the vehicle.

In an exemplary embodiment of the present disclosure, the controller may be configured to determine a first speed as the safe speed when the current speed of the vehicle does not exceed the first speed obtained by adding a first reference speed to the speed of the obstacle.

In an exemplary embodiment of the present disclosure, the controller may be configured to determine a second speed as the safe speed when the current speed of the vehicle exceeds the second speed obtained by adding a second reference speed to the speed of the obstacle.

In an exemplary embodiment of the present disclosure, the controller may be configured to determine the current speed of the vehicle as the safe speed when the current speed of the vehicle is greater than the first speed and less than or equal to the second speed.

According to another aspect of the present disclosure, a method of controlling biased driving of a vehicle includes detecting, by a first sensor, an obstacle on a road, capturing, by a second sensor, a surrounding image of the obstacle, determining, by a controller, an overtaking speed based on one of a speed of the obstacle, a lane encroachment amount of the obstacle, and a lateral separation distance from the obstacle when the vehicle travels biased in a lane due to the obstacle, and controlling, by the controller, the vehicle to overtake the obstacle at the overtaking speed.

In an exemplary embodiment of the present disclosure, the determining of the overtaking speed may include determining the overtaking speed applied in an overtaking section including a start point and an end point of overtaking for the obstacle.

In an exemplary embodiment of the present disclosure, the determining of the overtaking speed may include determining the overtaking speed based on the speed of the obstacle and the lane encroachment amount of the obstacle.

In an exemplary embodiment of the present disclosure, the determining of the overtaking speed may include determining a safe speed based on a current speed of the vehicle and the speed of the obstacle, determining a weight corresponding to the lane encroachment amount of the obstacle, and determining the overtaking speed by applying the weight to the safe speed and a preset maximum speed of the vehicle.

In an exemplary embodiment of the present disclosure, the determining of the safe speed may include determining a first speed as the safe speed when the current speed of the vehicle does not exceed the first speed obtained by adding a first reference speed to the speed of the obstacle, determining a second speed as the safe speed when the current speed of the vehicle exceeds the second speed obtained by adding a second reference speed to the speed of the obstacle, and determining the current speed of the vehicle as the safe speed when the current speed of the vehicle is greater than the first speed and less than or equal to the second speed.

In an exemplary embodiment of the present disclosure, the determining of the overtaking speed may include determining the overtaking speed based on the speed of the obstacle and the lateral separation distance from the obstacle.

In an exemplary embodiment of the present disclosure, the determining of the overtaking speed may include determining a safe speed based on a current speed of the vehicle and the speed of the obstacle, determining a weight corresponding to the lateral separation distance from the obstacle, and determining the overtaking speed by applying the weight to the safe speed and a preset maximum speed of the vehicle.

In an exemplary embodiment of the present disclosure, the determining of the safe speed may include determining a first speed as the safe speed when the current speed of the vehicle does not exceed the first speed obtained by adding a first reference speed to the speed of the obstacle, determining a second speed as the safe speed when the current speed of the vehicle exceeds the second speed obtained by adding a second reference speed to the speed of the obstacle, and determining the current speed of the vehicle as the safe speed when the current speed of the vehicle is greater than the first speed and less than or equal to the second speed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
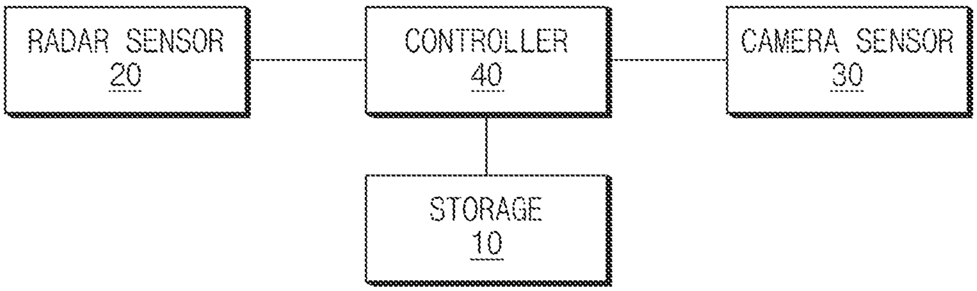
FIG. 1 is a block diagram illustrating the configuration of an apparatus for controlling biased driving of a vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein include the same meaning as commonly understood by one of ordinary skill in the art to which this disclosure belongs. It will be further understood that terms, such as those defined in commonly used dictionaries, should be interpreted as including a meaning that is consistent with their meaning in the context of the relevant art and will not be interpreted in an idealized or overly formal sense unless so defined herein.

FIG. 1 is a block diagram illustrating the configuration of an apparatus for controlling biased driving of a vehicle according to an exemplary embodiment of the present disclosure.

As shown in FIG. 1, an apparatus for controlling biased driving of a vehicle according to an exemplary embodiment of the present disclosure may include storage 10, a radio detection and ranging (radar) sensor 20, a camera sensor 30, and a controller 40. In the instant case, depending on a scheme of implementing an apparatus for controlling biased driving of a vehicle according to an exemplary embodiment of the present disclosure, components may be combined with each other to be implemented as one, or some components may be omitted.

Regarding each component, the storage 10 may store various logic, algorithms and programs required in a process of determining an overtaking speed based on one of a speed of an obstacle, a lane encroachment amount of the obstacle, and a lateral separation distance from the obstacle, and controlling the vehicle to overtake the obstacle at the overtaking speed in an overtaking section including a start point and an end point of overtaking for the obstacle when the vehicle travels biased in a lane of the road due to the obstacle.

In the instant case, the obstacle may include stationary obstacles and moving obstacles, where the stationary obstacles refer to various objects, and the moving obstacles refer to various vehicles. Furthermore, the time to start overtaking the obstacle may mean, for example, the time when the front bumper of a vehicle overtakes the rear of an obstacle, and the time point at which the overtaking of the obstacle end portions may mean, for example, the time when the front bumper of the vehicle overtakes the head of the obstacle or when the rear bumper of the vehicle overtakes the head of the obstacle.

The storage 10 may store various logic, algorithms and programs required in a process of determining an overtaking speed based on a speed of an obstacle and a lane encroachment amount of the obstacle, and controlling the vehicle to overtake the obstacle at the overtaking speed in an overtaking section including a start point and an end point of overtaking for the obstacle when the vehicle travels biased in a lane of the road due to the obstacle.

The storage 10 may store various logic, algorithms and programs required in a process of determining an overtaking speed based on a speed of an obstacle and a lateral separation distance from the obstacle, and controlling the vehicle to overtake the obstacle at the overtaking speed in an overtaking section including a start point and an end point of overtaking for the obstacle when the vehicle travels biased in a lane of the road due to the obstacle.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The radar sensor 20 may include a first radar sensor located at the front of a vehicle to measure the distance and relative speed to a front vehicle, a second radar sensor located at the left side of the vehicle to measure the distance and relative speed to a left vehicle, a third radar sensor located on the right side of the vehicle to measure the distance and relative speed to a right vehicle, and a fourth radar sensor located to the rear of the vehicle to measure the distance and relative speed to a rear vehicle. The radar sensor 20 may be replaced with a Light Detection and Ranging (LiDAR) sensor. The LiDAR sensor, which is a module that generates 3D images of objects around the vehicle, may track the speed of the vehicle as well as the driving paths of surrounding objects.

The camera sensor 30 may capture an image of the surroundings of the vehicle. The camera sensor 30 may include a front camera that captures a front image of the vehicle, a left camera that captures a left side image of the vehicle, a right camera that captures a right side image of the vehicle, and a rear camera that captures a rear side image of the vehicle.

The controller 40 may perform overall control so that each component performs its function. The controller 40 may be implemented in a form of hardware or software, or may be implemented in a combination of hardware and software. The controller 40 may be implemented as a microprocessor, but is not limited thereto.

Herein, in an exemplary embodiment of the present disclosure, the storage 10 and the processor of the controller 40 may be implemented as separate semiconductor circuits. Alternatively, the storage 10 and the processor of the controller 40 may be implemented as a single integrated semiconductor circuit. The processor may embody one or more processor(s).

The controller 40 may obtain various driving information (e.g., vehicle speed, road speed limit, and the like) through a vehicle network. In the instant case, the vehicle network may include a Controller Area Network (CAN), a controller area network with flexible data-rate (CAN FD), a Local Interconnect Network (LIN), FlexRay, a Media Oriented Systems Transport (MOST), Ethernet, and the like.

The controller 40 may be configured to determine an overtaking speed based on one of a speed of an obstacle, a lane encroachment amount of the obstacle, and a lateral separation distance from the obstacle, and control the vehicle to overtake the obstacle at the overtaking speed in an overtaking section including a start point and an end point of overtaking for the obstacle when the vehicle travels biased in a lane of the road due to the obstacle.

The controller 40 may be configured to determine an overtaking speed according to a speed of an obstacle and a lane encroachment amount of the obstacle, and control the vehicle to overtake the obstacle at the overtaking speed in an overtaking section including a start point and an end point of overtaking for the obstacle when the vehicle travels biased in a lane of the road due to the obstacle.

The controller 40 may be configured to determine an overtaking speed according to a speed of an obstacle and a lateral separation distance from the obstacle, and control the vehicle to overtake the obstacle at the overtaking speed in an overtaking section including a start point and an end point of overtaking for the obstacle when the vehicle travels biased in a lane of the road due to the obstacle.

Hereinafter, with reference to FIG. 2, FIG. 3 and FIG. 4, a process of determining a speed of a vehicle by the controller 40 will be described in detail.

Figure 2:
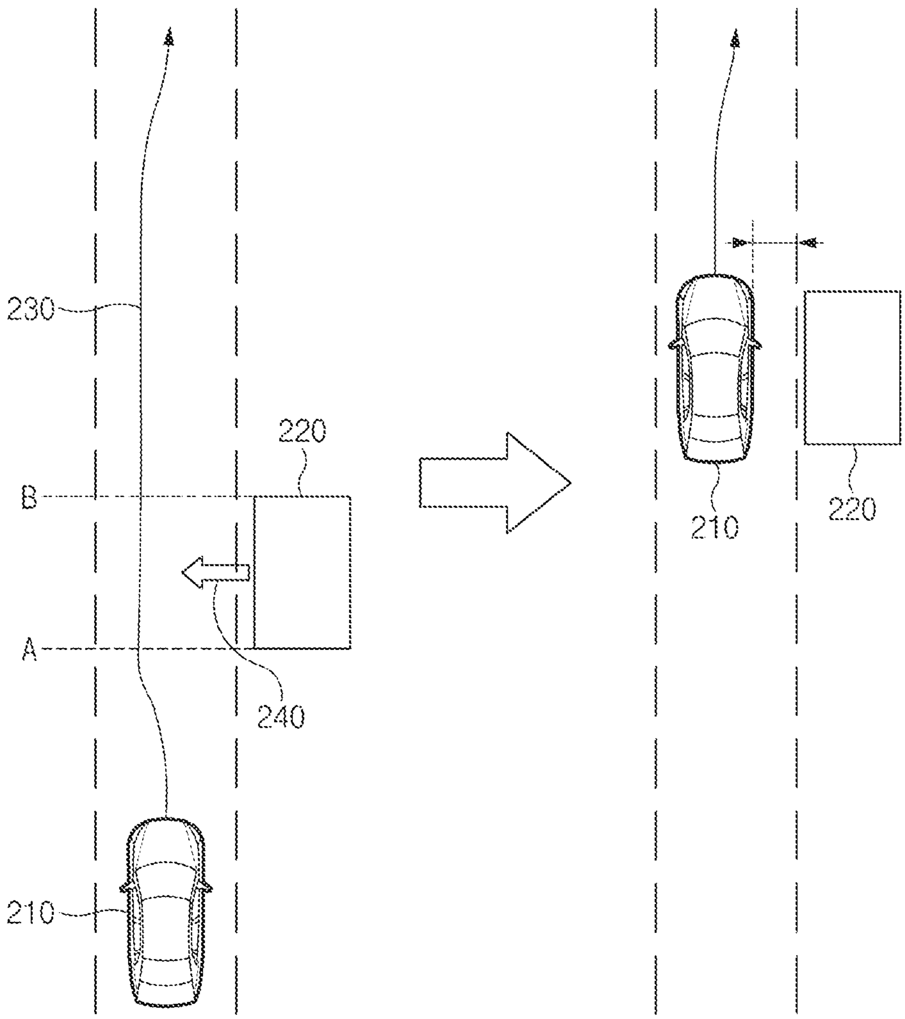
FIG. 2 is a diagram illustrating a process of determining a safe speed of a vehicle by a controller provided in an apparatus for controlling biased driving of a vehicle according to an exemplary embodiment of the present disclosure.

FIG. 2 is a diagram illustrating a process of determining a safe speed of a vehicle by a controller provided in an apparatus for controlling biased driving of a vehicle according to an exemplary embodiment of the present disclosure.

In FIG. 2, reference numeral 210 indicates a vehicle (e.g., an autonomous vehicle) provided with an apparatus for controlling biased driving of a vehicle according to an exemplary embodiment of the present disclosure, reference numeral 220 indicates a moving obstacle driving in a right lane, reference numeral "A" indicates the start point of overtaking for the moving obstacle 220, and reference numeral "B" indicates the end point of overtaking for the moving obstacle 220.

As shown in FIG. 2, in 230, as the moving obstacle 220 approaches to the vehicle 210 along the lane in which the vehicle 210 is traveling, the vehicle 210 travels biased in the lane. Because such biased driving 230 may generate a sense of incongruity, it is necessary to minimize the sense of incongruity felt by the user. Because the sense of incongruity is maximized in section AB, a process of determining the speed of the vehicle 210 in section AB according to an exemplary embodiment of the present disclosure will be described. Of course, the speed of the vehicle 210 may be determined in the entire section of the biased driving 230.

The controller 40 may be configured to determine a safe speed of the vehicle 210 in the section AB based on the speed of the moving obstacle 220. For example, the controller 40 may be configured to determine a safe speed Vs of the vehicle 210 based on following Equation 1.

$$Vs = Vo + 5\text{ km/h, If } (Ve \leq Vo + 5\text{ km/h}) \quad \text{[Equation 1]}$$

Where Ve represents the current speed of the vehicle 210, and Vo represents the speed of the moving obstacle 220. For reference, the vehicle 210 overtakes the moving obstacle 220 at a relative speed of 5 km/h (=1.39 m/s). In the instant case, because the length of the moving obstacle 220 is 5.5 m, and it takes 3.6 seconds for the vehicle 210 to move 5.5 m, and when the moving obstacle 210 approaches at a lateral speed of 0.1 m/s and a lateral jerk of 0.5 $m/s^2$, the lateral movement distance for 3.6 seconds is 55 cm, so that the lateral movement distance is smaller than the minimum safety distance of 60 cm.

When the safe speed Vs of the vehicle 210 is determined based on Equation 1, the controller 40 may be configured to determine an acceleration amount Va based on following Equation 2.

$$Va = (Vs - Ve)/10\text{ seconds} \quad \text{[Equation 2]}$$

As an exemplary embodiment of the present disclosure, the controller 40 may be configured to determine the safe speed Vs of the vehicle 210 based on the following Equation 3.

$$Vs = Vo + 30\text{ km/h, If } (Ve \geq Vo + 30\text{ km/h}) \quad \text{[Equation 3]}$$

Where Ve represents the current speed of the vehicle 210, and Vo represents the speed of the moving obstacle 220. For reference, the vehicle 210 overtakes the moving obstacle 220 while decelerating at 5 $m/s^2$ from a relative speed of 30 km/h (=8.3 m/s). In the instant case, 1.66 seconds are required to reach a relative speed of 0 m/s, and when the moving obstacle 210 approaches at a lateral speed of 0.5 m/s and a lateral jerk of 0.5 $m/s^2$ in 240, the lateral movement distance is 58 cm for 1.66 seconds, so that the lateral movement distance is smaller than the minimum safety distance of 60 cm.

When the safe speed Vs of the vehicle 210 is determined based on Equation 3, the controller 40 may be configured to determine an deceleration amount Vd based on following Equation 4.

$$Vd = (Vs - Ve)/10\text{ second} \quad \text{[Equation 4]}$$

As yet another example, the controller 40 may be configured to determine the safe speed Vs of the vehicle 210 based on the following Equation 5.

$$Vs = Ve, \text{ when } (Vo + 5\text{ km/h} < Ve < Vo + 30\text{ km/h}) \quad \text{[Equation 5]}$$

Where Ve represents the current speed of the vehicle 210, and Vo represents the speed of the moving obstacle 220.

Meanwhile, the controller 40 may be configured to determine the maximum speed of the vehicle 210. For example, the maximum speed of the vehicle 210 may be one of the speed limit of the road or the maximum speed set in an apparatus for controlling biased driving.

The controller 40 may be configured to determine the final speed based on the safe speed and the maximum speed of the vehicle 210. That is, the controller 40 may be configured to determine the final speed of the vehicle 210 based on following Equation 6.

$$Vf = (w \times Vs) + ((1 - w) \times Vm) \quad \text{[Equation 6]}$$

Where Vf represents a final speed, w represents a weight, Vs represents a safe speed, and Vm represents the maximum speed.

Figure 3:
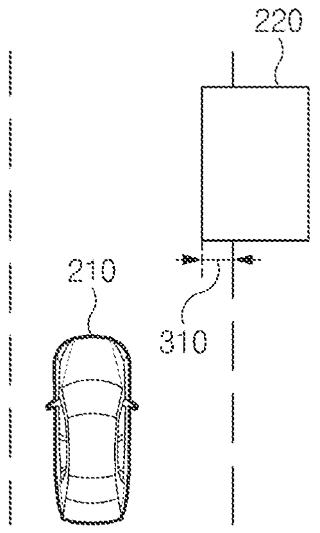
FIG. 3 is a diagram illustrating a process of determining a weight corresponding to a lane encroachment amount of a moving obstacle by a controller provided in an apparatus for controlling biased driving of a vehicle according to an exemplary embodiment of the present disclosure.

FIG. 3 is a diagram illustrating a process of determining a weight corresponding to a lane encroachment amount of a moving obstacle by a controller provided in an apparatus for controlling biased driving of a vehicle according to an exemplary embodiment of the present disclosure.

In FIG. 3, reference numeral 310 represents a lane encroachment amount (length) of the moving obstacle 220. The lane encroachment amount indicates an amount by which the moving obstacle 220 has encroached into the lane in which the vehicle 210 is traveling. The controller 40 may be configured to determine a weight corresponding to the lane encroachment amount 310 of the moving obstacle 220 based on following Table 1.

TABLE 1

| Lane encroachment amount | 40 cm or more | 30 cm | 20 cm | 0 cm |
|---|---|---|---|---|
| Weight | 1 | 0.6 | 0.3 | 0 |

For example, when the lane encroachment amount is 35 cm, the controller 40 may be configured to determine the weight as 0.8, and when the lane encroachment amount is 25 cm, the controller 40 may be configured to determine the weight as 0.45.

Figure 4:
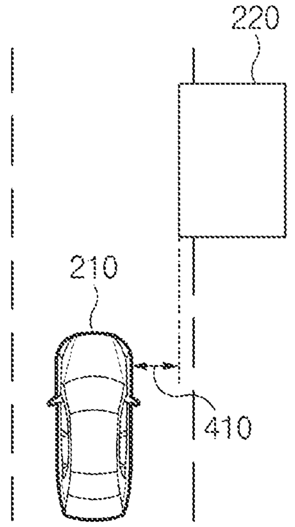
FIG. 4 is a diagram illustrating a process of determining a weight corresponding to a lateral separation distance from a moving obstacle by a controller provided in an apparatus for controlling biased driving of a vehicle according to an exemplary embodiment of the present disclosure.

FIG. 4 is a diagram illustrating a process of determining a weight corresponding to a lateral separation distance from a moving obstacle by a controller provided in an apparatus for controlling biased driving of a vehicle according to an exemplary embodiment of the present disclosure.

In FIG. 4, reference numeral 410 represents a lateral separation distance from a lateral side of the moving obstacle 220 to the vehicle 210. The controller 40 may be configured to determine a weight corresponding to the lateral separation distance 410 from the moving obstacle 200 based on following Table 2.

TABLE 2

| Lateral separation distance | Stationary obstacle | 20 cm | 30 cm | 40 cm | 60 cm or more |
|---|---|---|---|---|---|
| | Moving obstacle | 60 cm | 70 cm | 80 cm | 100 cm or more |
| Weight | | 1 | 0.6 | 0.3 | 0 |

In Table 2, when the lateral separation distance of the stationary obstacle is less than 20 cm, the controller 40 may prohibit overtaking of the stationary obstacle and control the lane change of the vehicle 210. Furthermore, when the lateral separation distance of the moving obstacle is less than 60 cm, the controller 40 may prohibit overtaking of the moving obstacle and control the lane change of the vehicle 210.

Meanwhile, the controller 40 may be configured to determine a larger value of a weight corresponding to the lane encroachment amount of the moving obstacle 220 and a weight corresponding to the lateral separation distance from the moving obstacle 220 as the final weight, and may be configured to determine the final speed of the vehicle 210 by applying the final weight to Equation 6.

For example, when the lane encroachment amount of the moving obstacle 220 is 0 cm and the lateral separation distance from the moving obstacle 220 is 60 cm, the weight corresponding to the lane encroachment amount of the moving obstacle 220 is '0 (zero)', and the weight corresponding to the lateral separation distance from the moving obstacle 220 is '1', so that the controller 40 may overtake the moving obstacle 220 at a safe speed.

As an exemplary embodiment of the present disclosure, when the lane encroachment amount of the moving obstacle 220 is 40 cm and the lateral separation distance from the moving obstacle 220 is 100 cm, the weight corresponding to the lane encroachment amount of the moving obstacle 220 is '1', and the weight corresponding to the lateral separation distance from the moving obstacle 220 is '0 (zero)', so that the controller 40 may overtake the moving obstacle 220 at a safe speed.

As yet another example, when the lane encroachment amount of the moving obstacle 220 is 0 cm and the lateral separation distance from the moving obstacle 220 is 100 cm, the weight corresponding to the lane encroachment amount of the moving obstacle 220 is '0', and the weight corresponding to the lateral separation distance from the moving obstacle 220 is '0 (zero)', so that the controller 40 may overtake the moving obstacle 220 at a safe speed.

Figure 5:
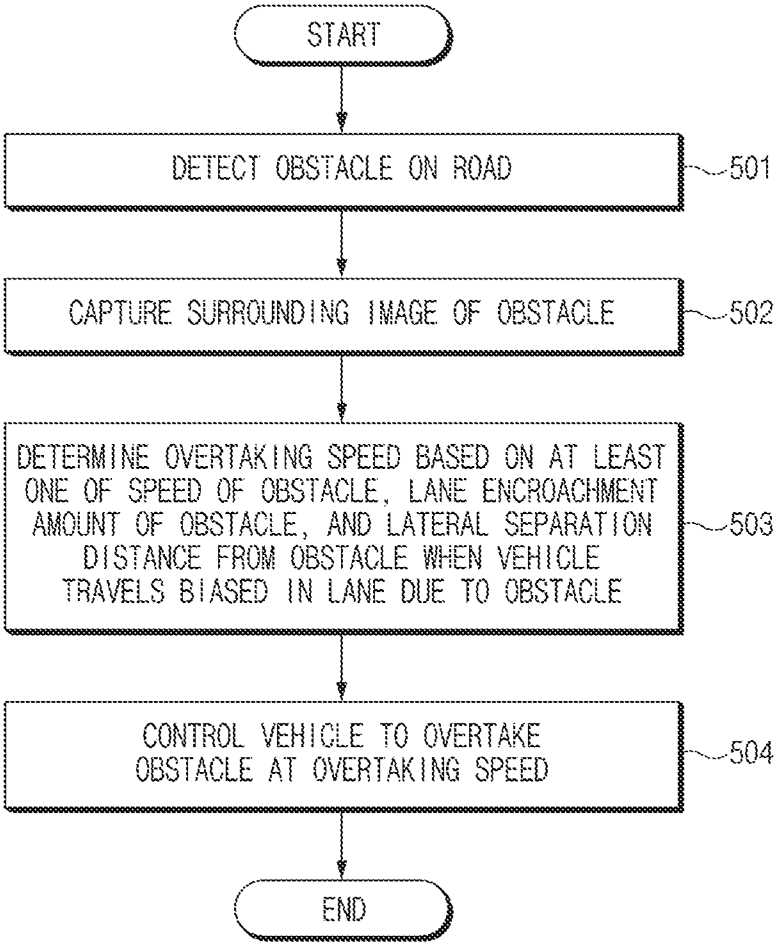
FIG. 5 is a flowchart illustrating a method of controlling biased driving of a vehicle according to an exemplary embodiment of the present disclosure.

FIG. 5 is a flowchart illustrating a method of controlling biased driving of a vehicle according to an exemplary embodiment of the present disclosure.

First, the radar sensor 20 detects an obstacle on a road in 501.

Accordingly, the camera sensor 30 captures a surrounding image of the obstacle in 502.

Thereafter, when the vehicle travels biased in the lane due to the obstacle, in 503, the controller 40 is configured to determine an overtaking speed based on one of a speed of the obstacle, a lane encroachment amount of an obstacle, and a lateral separation distance from the obstacle.

Thereafter, the controller 40 is configured to control the vehicle to overtake the obstacle at the overtaking speed in 504.

In an exemplary embodiment of the present disclosure, so as to overtake the obstacle at the overtaking speed in 504, the controller 40 may control a speed of a driving motor or an engine or a steering angle of the vehicle.

Figure 6:
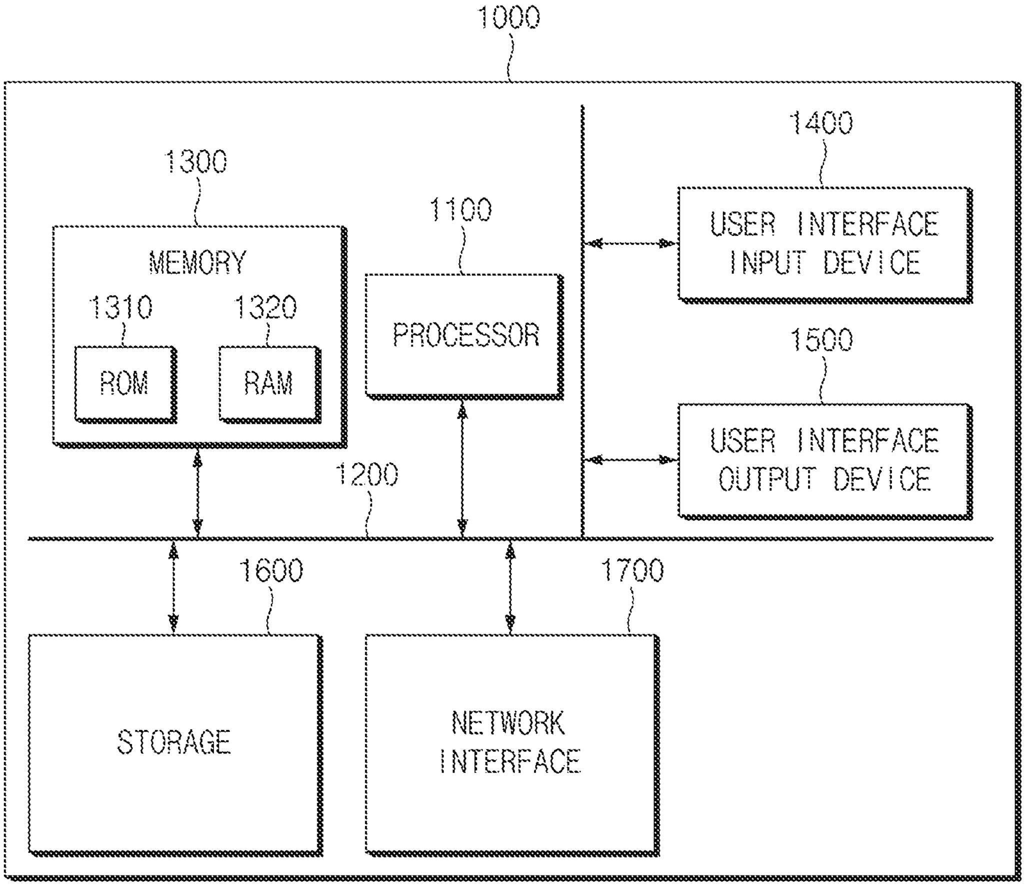
FIG. 6 is a block diagram illustrating a computing system for executing a method of controlling biased driving of a vehicle according to an exemplary embodiment of the present disclosure.

FIG. 6 is a block diagram illustrating a computing system for executing a method of controlling biased driving of a vehicle according to an exemplary embodiment of the present disclosure.

Referring to FIG. 6, a method of controlling biased driving of a vehicle according to an exemplary embodiment of the present disclosure described above may be implemented through a computing system. A computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to the exemplary embodiments of the present disclosure, it is possible to reduce a user's sense of discomfort during biased driving in a lane by determining an overtaking speed based on at least one of a speed of an obstacle, a lane encroachment amount of the obstacle, or a lateral separation distance from the obstacle and controlling the vehicle to overtake the obstacle at the overtaking speed in an overtaking section including a start point and an end point of overtaking for the obstacle when the vehicle travels biased in the lane due to the obstacle.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling biased driving of a vehicle, the apparatus comprising:

a first sensor configured to detect an obstacle on a road on which the vehicle drives;

a second sensor configured to capture a surrounding image of the obstacle; and a controller electrically connected to the first sensor and the second sensor and configured to determine, based on the vehicle traveling biased within a lane of the road due to the obstacle, an overtaking speed based on a lane encroachment amount of the obstacle and at least one of a speed of the obstacle, or a lateral separation distance from the obstacle, and control the vehicle to overtake the obstacle by controlling a traveling speed of the vehicle to the overtaking speed.

2. The apparatus of claim 1, wherein the controller is further configured to determine the overtaking speed applied in an overtaking section including a start point and an end point of overtaking for the obstacle.

3. The apparatus of claim 1, wherein the controller is further configured to determine the overtaking speed based on the speed of the obstacle and the lane encroachment amount of the obstacle.

4. The apparatus of claim 3, wherein the controller is further configured to determine a safe speed based on a current speed of the vehicle and the speed of the obstacle, determine a weight corresponding to the lane encroachment amount of the obstacle, and determine the overtaking speed by applying the weight to the safe speed and a preset maximum speed of the vehicle.

5. The apparatus of claim 4, wherein the controller is further configured to determine a first speed as the safe speed based on determining that the current speed of the vehicle does not exceed the first speed obtained by adding a first reference speed to the speed of the obstacle.

6. The apparatus of claim 5, wherein the controller is further configured to determine a second speed as the safe speed based on determining that the current speed of the vehicle exceeds the second speed obtained by adding a second reference speed to the speed of the obstacle.

7. The apparatus of claim 6, wherein the controller is further configured to determine the current speed of the vehicle as the safe speed based on determining that the current speed of the vehicle is greater than the first speed and less than or equal to the second speed.

8. The apparatus of claim 1, wherein the controller is further configured to determine the overtaking speed based on the speed of the obstacle and the lateral separation distance from the obstacle.

9. The apparatus of claim 8, wherein the controller is further configured to determine a safe speed based on a current speed of the vehicle and the speed of the obstacle, determine a weight corresponding to the lateral separation distance from the obstacle, and determine the overtaking speed by applying the weight to the safe speed and a preset maximum speed of the vehicle, and wherein the weight corresponding to the lateral separation distance from the obstacle is determined further based on whether the obstacle is a moving obstacle or a stationary obstacle.

10. The apparatus of claim 9, wherein the controller is further configured to determine a first speed as the safe speed based on determining that the current speed of the vehicle does not exceed the first speed obtained by adding a first reference speed to the speed of the obstacle.

11. The apparatus of claim 10, wherein the controller is further configured to determine a second speed as the safe speed based on determining that the current speed of the vehicle exceeds the second speed obtained by adding a second reference speed to the speed of the obstacle.

12. The apparatus of claim 11, wherein the controller is further configured to determine the current speed of the vehicle as the safe speed based on determining that the current speed of the vehicle is greater than the first speed and less than or equal to the second speed.

13. A method of controlling biased driving of a vehicle, the method comprising:

detecting, by a first sensor, an obstacle on a road on which the vehicle drives;

capturing, by a second sensor, a surrounding image of the obstacle;

determining, by a controller connected to the first sensor and the second sensor, based on the vehicle traveling biased within a lane of the road due to the obstacle, an overtaking speed based on a lane encroachment amount of the obstacle and at least one of a speed of the obstacle, or a lateral separation distance from the obstacle based on the vehicle travelling; and controlling, by the controller, the vehicle to overtake the obstacle by controlling a traveling speed of the vehicle to the overtaking speed.

14. The method of claim 13, wherein the determining of the overtaking speed includes:

determining, by the controller, the overtaking speed applied in an overtaking section including a start point and an end point of overtaking for the obstacle.

15. The method of claim 13, wherein the determining of the overtaking speed includes:

determining, by the controller, the overtaking speed based on the speed of the obstacle and the lane encroachment amount of the obstacle.

16. The method of claim 15, wherein the determining of the overtaking speed includes:

determining, by the controller, a safe speed based on a current speed of the vehicle and the speed of the obstacle;

determining, by the controller, a weight corresponding to the lane encroachment amount of the obstacle; and determining, by the controller, the overtaking speed by applying the weight to the safe speed and a preset maximum speed of the vehicle.

17. The method of claim 16, wherein the determining of the safe speed includes:

determining, by the controller, a first speed as the safe speed based on determining that the current speed of the vehicle does not exceed the first speed obtained by adding a first reference speed to the speed of the obstacle;

determining, by the controller, a second speed as the safe speed based on determining that the current speed of the vehicle exceeds the second speed obtained by adding a second reference speed to the speed of the obstacle; and determining, by the controller, the current speed of the vehicle as the safe speed based on determining that the current speed of the vehicle is greater than the first speed and less than or equal to the second speed.

18. The method of claim 13, wherein the determining of the overtaking speed includes determining, by the controller, the overtaking speed based on the speed of the obstacle and the lateral separation distance from the obstacle.

19. The method of claim 18, wherein the determining of the overtaking speed includes:

determining, by the controller, a safe speed based on a current speed of the vehicle and the speed of the obstacle;

determining, by the controller, a weight corresponding to the lateral separation distance from the obstacle; and determining, by the controller, the overtaking speed by applying the weight to the safe speed and a preset maximum speed of the vehicle.

20. The method of claim 19, wherein the determining of the safe speed includes:

determining, by the controller, a first speed as the safe speed based on determining that the current speed of the vehicle does not exceed the first speed obtained by adding a first reference speed to the speed of the obstacle;

determining, by the controller, a second speed as the safe speed based on determining that the current speed of the vehicle exceeds the second speed obtained by adding a second reference speed to the speed of the obstacle; and determining, by the controller, the current speed of the vehicle as the safe speed based on determining that the current speed of the vehicle is greater than the first speed and less than or equal to the second speed.

* * * * *